United States Patent
Alberi-Morel et al.

(10) Patent No.: US 9,491,629 B2
(45) Date of Patent: Nov. 8, 2016

(54) METHOD FOR PROVIDING A MINIMUM COVERAGE FOR MULTIMEDIA TRANSMISSION IN PRESENCE OF SWITCHED OFF CELLS

(75) Inventors: Marie Line Alberi-Morel, Nozay (FR); Carine Balageas, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 354 days.

(21) Appl. No.: 13/989,349

(22) PCT Filed: Oct. 13, 2011

(86) PCT No.: PCT/EP2011/067931
§ 371 (c)(1),
(2), (4) Date: Sep. 13, 2013

(87) PCT Pub. No.: WO2012/069253
PCT Pub. Date: May 31, 2012

(65) Prior Publication Data
US 2014/0004870 A1 Jan. 2, 2014

(30) Foreign Application Priority Data
Nov. 26, 2010 (EP) .................................. 10306298

(51) Int. Cl.
| H04W 74/00 | (2009.01) |
| H04W 16/10 | (2009.01) |
| H04B 7/02 | (2006.01) |
| H04L 29/06 | (2006.01) |
| H04W 24/04 | (2009.01) |
| H04W 52/40 | (2009.01) |

(52) U.S. Cl.
CPC .............. *H04W 16/10* (2013.01); *H04B 7/022* (2013.01); *H04L 65/80* (2013.01); *H04W 24/04* (2013.01); *H04W 52/40* (2013.01)

(58) Field of Classification Search
CPC ... H04W 16/10; H04W 24/04; H04W 52/40; H04B 7/022; H04L 65/80

USPC ........................................ 455/452.1; 370/338
See application file for complete search history.

(56) References Cited

U.S. PATENT DOCUMENTS

| 2005/0163083 A1* | 7/2005 | Mantravadi et al. ......... 370/335 |
| 2007/0053282 A1* | 3/2007 | Tong ....................... H04B 7/04 370/208 |
| 2009/0222709 A1* | 9/2009 | Lin et al. ....................... 714/776 |
| 2009/0305709 A1 | 12/2009 | Panico et al. |

FOREIGN PATENT DOCUMENTS

| CN | 101352059 A | 1/2009 |
| EP | 2 071 803 A1 | 6/2009 |
| WO | WO 2010104433 A1 * | 9/2010 ............ H04W 52/02 |

OTHER PUBLICATIONS

Marco Ajmone Marsan et al., "Optimal Energy Savings in Cellular Access Networks," Communications Workshops, IEEE, XP021515485, pp. 1-5, Jun. 14, 2009.
International Search Report for PCT/EP2011/067931 dated Oct. 21, 2011.

* cited by examiner

*Primary Examiner* — Marcos Batista
(74) *Attorney, Agent, or Firm* — Fay Sharpe, LLP

(57) ABSTRACT

A method, in a cellular communication network comprising cells with at least one switched off cell, for providing a minimum coverage for multimedia transmission, said multimedia being parted into a number of independent autonomous multimedia partitions, comprising the steps of: —transmitting from all neighbor cells (3-8) of said switched off cell (1), multimedia partition(s) of a primary subset over a normal range, —transmitting from at least a first (3-8) and a second (3-8) neighbor cells of said switched off cell (1), multimedia partition(s) of a secondary subset over an extended range (3'-8'), the secondary subset of said first neighbor cell (3-8) being partially disjoint of the secondary subset of said second neighbor cell (3-8) when first and second cells are adjacent.

15 Claims, 4 Drawing Sheets

Figure 1:
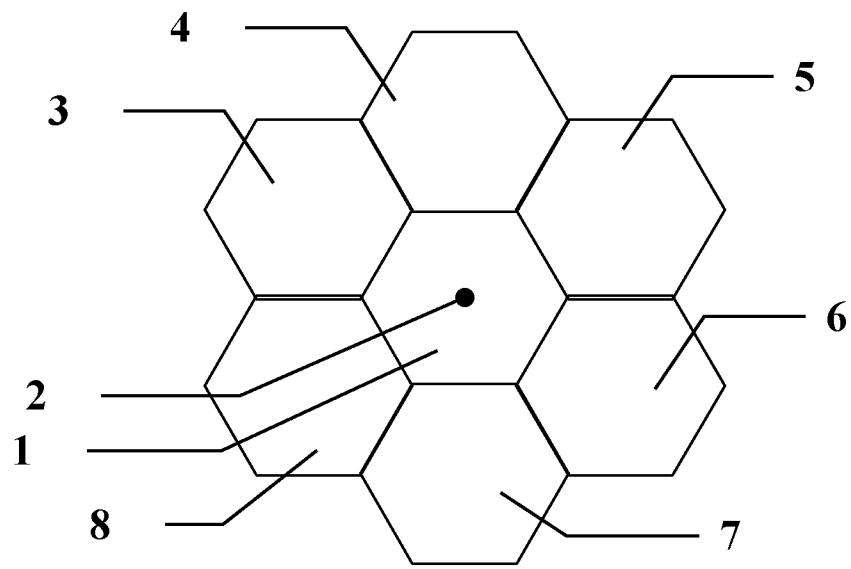

METHOD FOR PROVIDING A MINIMUM COVERAGE FOR MULTIMEDIA TRANSMISSION IN PRESENCE OF SWITCHED OFF CELLS

The technical domain of the invention is the domain of communication networks.

More particularly, the invention concerns a method to optimize coverage in a cellular communication network where at least one cell is switched off.

In order to save energy at the network level, some cells of a cellular network may be switched off when the total load is low, e.g. at night.

However the switching off of a cell creates a hole in the area initially covered by said switched off cell.

The object of at least one embodiment is to propose to cover such coverage holes with at least a minimal quality of service while minimizing the global transmission power budget of the network. Said object is reach, particularly in the frame of multimedia contents transmission, by exploiting the flexibility brought by Multiple Description Coding (MDC).

The object of at least one embodiment is a method, in a cellular communication network comprising cells among which at least one cell is switched off, for providing at least a minimum coverage for multimedia transmission, said multimedia being parted into a number of independent autonomous multimedia partitions, comprising the steps of:
transmitting from all neighbor cells of said switched off cell, multimedia partition(s) of a primary subset of all multimedia partitions over a normal range,
transmitting from at least a first and a second neighbor cells of said switched off cell, multimedia partition(s) of a secondary subset of all multimedia partitions over an extended range, said secondary subset being totally disjoint from said primary subset,
the secondary subset of said first neighbor cell being partially disjoint of the secondary subset of said second neighbor cell when said first cell and said second cell are adjacent.

According to another feature, each cell among the neighbor cells of said switched off cell transmits at least one multimedia partition, over an extended range.

According to another feature, each multimedia partition, among all multimedia partitions, is transmitted by at least one cell among the neighbor cells of said switched off cell, over an extended range.

According to another feature, transmission of at least one multimedia partition over an extended range is protected by adding a protection code.

According to another feature, said transmission is protected by forward error correction, FEC.

According to another feature, transmission of at least one multimedia partition over an extended range is done with an emitting power generally equal to a normal emitting power used for transmitting over a normal range.

According to another feature, transmission of at least one multimedia partition over an extended range is done with an emitting power extended with respect to a normal emitting power used for transmitting over a normal range.

According to another feature, union of said primary subset and of said secondary subset of a neighbor cell comprises all multimedia partitions.

Alternately and according to another feature, a number of multimedia partitions are absent from said primary subset and from said secondary subset of a neighbor cell and thus not transmitted from said cell.

According to another feature, said number of absent multimedia partitions is determined so that the power budget for said neighbor cell, is lesser or equal than the power budget of said cell if it would transmit all multimedia partitions over a normal range, taking into account any eventual protection budget.

According to another feature, said number of absent multimedia partition is equal to the ratio of the cardinal of the secondary subset to the coding rate of the protection code.

According to another feature, the number of independent autonomous multimedia partitions is equal to half the number of neighbor cells of a switched off cell times the cardinal of the secondary subset.

According to another feature, switched off cells are regularly disseminated among all the cells.

Figure 3:
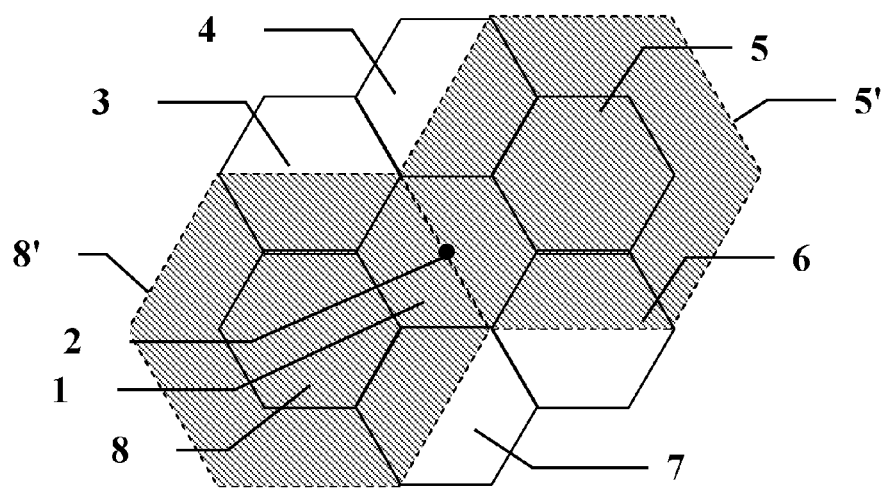
Figure 4:
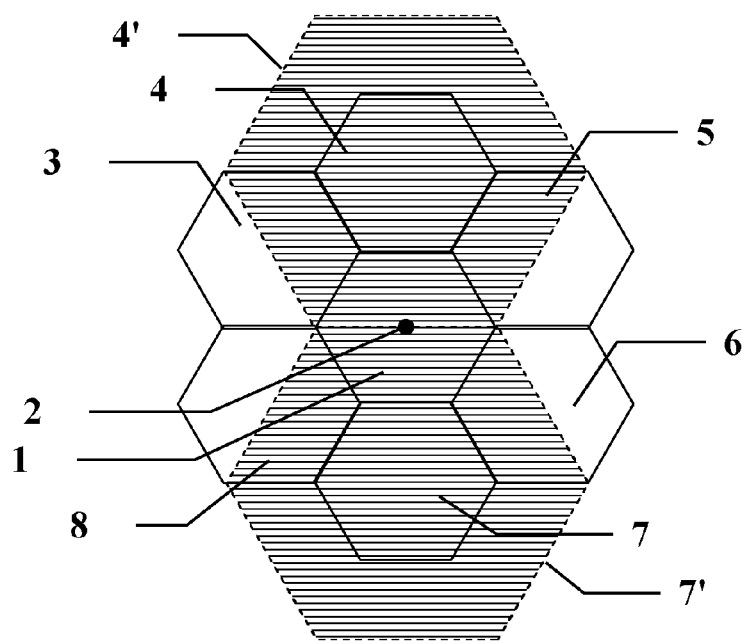
Figure 5:
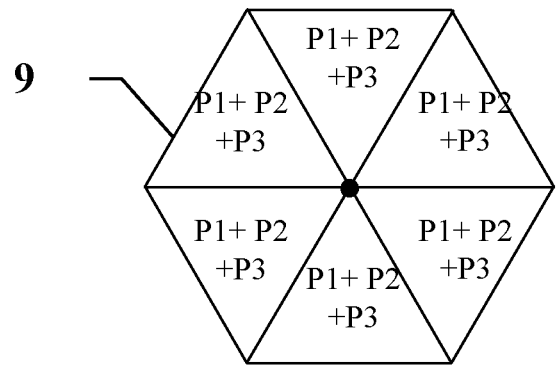
Figure 6:
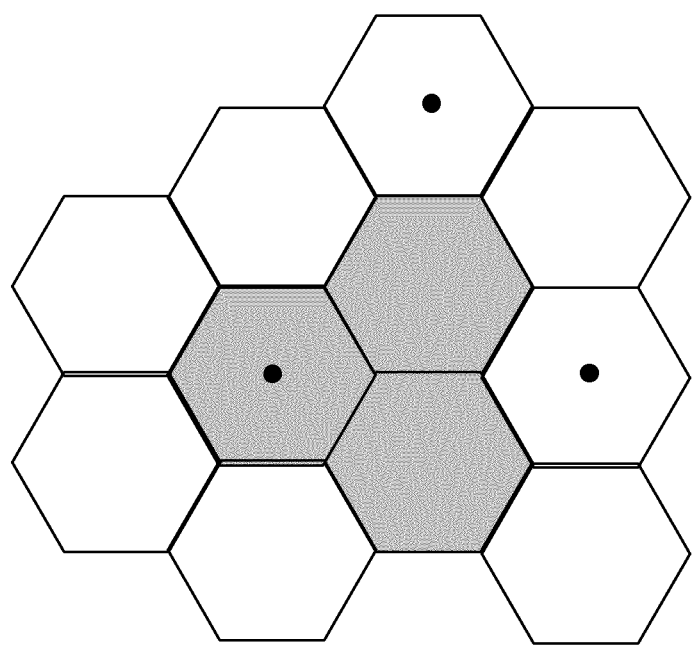
Figure 7:
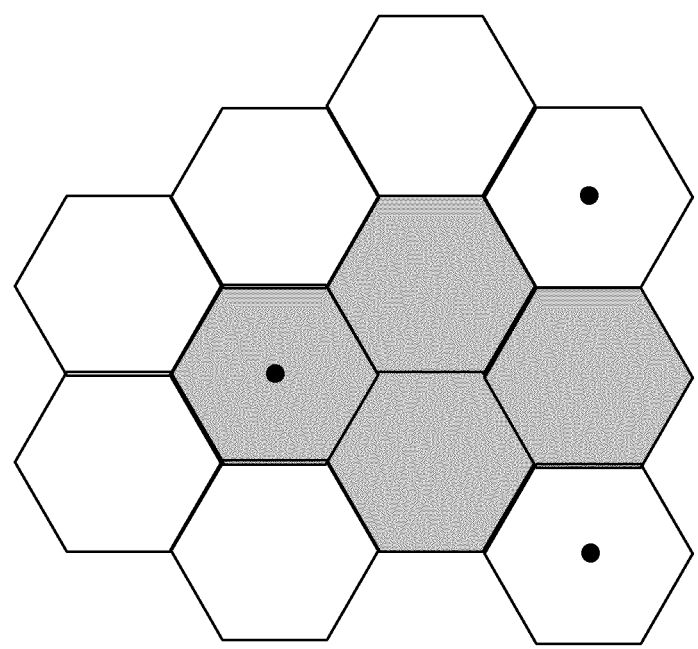

Others features, details and advantages will become more apparent from the detailed illustrating description given hereafter with respect to the drawings on which:

FIGS. 1-4 are schematic plan views of an illustrative cellular network with at least one switched off cell, FIG. 5 is a zoomed detail of the coverage of said switched off cell, FIGS. 6-7 are illustrative of some switching off patterns.

Multiple Description Coding (MDC) is a technique that fragments a single multimedia content bitstream into at least two independent substreams referred to as multimedia partitions or descriptions or layers. Each multimedia partition is intended to be independently transported. The packets of each partition can be routed over multiple, different paths. At reception any partition can be used to decode the multimedia bitstream. When more than one partition are received and available, a decoder can process them jointly, and the resulting multimedia quality increases. The highest reproduced quality is available if all original partitions are received and available for decoding. The initial aim of MDC is to provide error resilience to multimedia stream transmissions. Since an arbitrary and reduced number of partitions can be used to decode the original stream, network congestions or packet losses (which are common in best-effort networks such as e.g. the Internet) does not interrupt the multimedia content transmission and display but only causes a (temporary) loss of quality.

To compensate for the coverage hole introduced by the switching off of a cell, it is known to ask to at least some of the neighbor cells of said switched off cell to increase their transmission power. This solution is relevant for all types of transmitted content.

However, when considering multimedia content, and the properties of MDC, the global transmission power budget over the network can be further reduced while still guaranteeing a satisfactory level of reception, or quality of experience (QoE).

FIG. 1 shows an illustrative cellular network that will be used to help describing the principles of the present application. Said network comprise some cells 1, 3-8. One of them, cell 1, is switched off. Its neighbor cells, e.g. cells 3-8 are ON and try to compensate for the coverage hole let in the area 1 formerly covered by cell 1.

According to one embodiment, the multimedia content to be transmitted is parted into a number n of independent autonomous multimedia partitions, e.g. MDC partitions. Since these partitions are independent and autonomous, the number available for reception in every area may not necessary be the maximum n, but can be reduced to a lesser number in order to reduce the global transmission power budget. As soon as, at least one partition may be received in every area, including the coverage holes let by switched off cells 1, a minimum coverage is provided.

The proposed method may provide at least a minimum coverage for multimedia transmission, by transmitting from all neighbor cells 3-8 of said switched off cell 1, multimedia partition(s) of a primary subset of all multimedia partitions over a normal range and by transmitting from at least a first and a second neighbor cells 3-8 of said switched off cell 1, multimedia partition(s) of a secondary subset of all multimedia partitions over an extended range. A normal range may be understood here as a range usual for a cell, i.e. the range used when all cells are switched ON. An extended range may be understood here as a range extended at least to cover the centre 2 of said switched off cell 1.

The primary and secondary subsets are each defined for each cell and may be different from one cell to another. Advantageously, the secondary subset of a given cell is totally disjoint from the primary subset of said cell, since a given partition, if transmitted by a given cell, is either transmitted over a normal range or over an extended range.

Totally disjoint must be understood in the present application as not comprising any element (here partition) in common.

In order to benefit from the properties of MDC the secondary subset of a first neighbor cell is advantageously partially disjoint of the secondary subset of a second neighbor cell when said first neighbor cell and said second neighbor cell are adjacent. This rule is referred as "non adjacency rule" in the following text.

Partially disjoint must be understood in the present application as not totally overlapping. In other words, at least one element comprised in a first set is not comprised in a second set partially disjoint from said first set or at least one element comprised in the second set is not comprised in the first set. In other words, at least one element is comprised in only one of the two sets.

On the contrary, when said first neighbor cell and said second neighbor cell are not adjacent, they may transmit the same partitions, that is their respective secondary subsets may exactly overlap.

Figure 2:
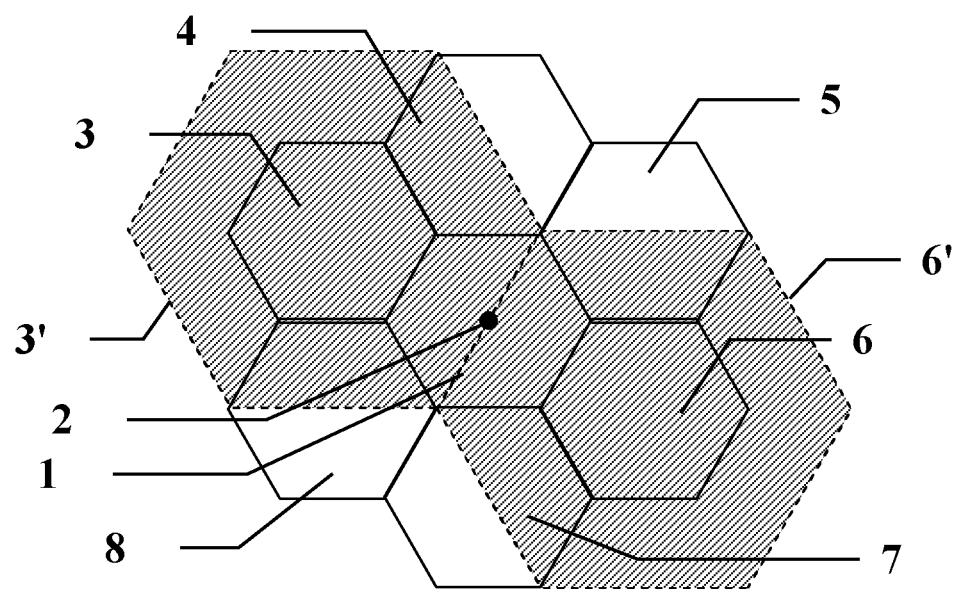

To illustrate said rule, one may refer to an example illustrated at FIGS. 2-4. Here the topology is supposed to be hexagonal and the switched off cell 1 has six neighbor cells 3-8. It is assumed here that the MDC uses three (n=3) different partitions named P1, P2, P3. In order to enforce the "non adjacency rule", a first cell 3 may transmit P1 with an extended range 3' as illustrated in FIG. 2, a second cell 4 may transmit a partially disjoint subset, that is not comprising only P1, e.g. P2 with an extended range 4', as illustrated in FIG. 3 and a third cell 5 may transmit a partially disjoint subset, that is not comprising only P2, e.g. P3 with an extended range 5', as illustrated in FIG. 4. To complete the figure, while still enforcing the rule, cell 6 may transmit P1 with an extended range 6' as illustrated in FIG. 2, cell 7 may transmit P2 with an extended range 7' as illustrated in FIG. 3, and cell 8 may transmit P3 with an extended range 8' as illustrated in FIG. 4. In the previous first example, all secondary subsets, even corresponding to non adjacent cells, are partially disjoint. In addition they are even totally disjoint. This provides the lowest budget, but also leads to the lowest QoE.

Here, as can be seen in FIG. 5, figuring partitions that can be received according to the location of the receiver in the coverage hole of cell 1, all three partitions P1, P2 and P3 may be received everywhere. A receiver, e.g. located in quarter 9 may receive P1 from cell 3, may receive P3 from cell 8 and may receive P2 from cell 4.

However, the total disjunction is not mandatory, and secondary subsets of non adjacent cells may overlap as in the following distinct second example. Let us assume that the MDC uses six (n=6) different partitions named P1-P6. In order to enforce the "non adjacency rule", a first cell 3 may transmit P1, P2 and P3, a second cell 4 may transmit P4, P5 and P6 and a third cell 5 may transmit P1, P2 and P3. To complete the figure, while still enforcing the rule, cell 6 may transmit P4, P5 and P6, cell 7 may transmit P1, P2 and P3 and cell 8 may transmit P4, P5 and P6. Here some non adjacent cells, e.g. cell 3 and cell 5 share some partitions. This "redundancy" prejudicially raises the budget but advantageously raises the number of partitions that may be received in a given area, thus raising the QoE.

Here again, as in the first example, all six partitions P1-P6 may be received everywhere. A receiver, e.g. located in quarter 9, may receive P1-P3 from cell 3 and may receive P4-P6 from cell 8 and/or from cell 4.

According to a third example, secondary subsets of adjacent cells may also partially overlap while enforcing the "non adjacency rule". Let us assume that the MDC uses six (n=6) different partitions named P1-P6. A first cell 3 may transmit P1 and P2, a second cell 4 may transmit P2 and P3, a third cell P3 and P4. To complete the figure, while still enforcing the rule, cell 6 may transmit P4 and P5, cell 7 may transmit P5 and P6 and cell 8 may transmit P6 and P1. Here all adjacent cells share one partition but have each one not shared partition. This "redundancy" prejudicially raises the budget but advantageously raises the number of partitions that may be received in a given area, thus raising the QoE.

Here, not all partitions P1-P6 may be received everywhere. A receiver, e.g. located in quarter 9, may receive P1 and P2 from cell 3, may receive P2 and P3 from cell 4 and may receive P1 and P6 from cell 8, that is, four partitions P1, P2, P3, P6 out of six, two of them P1, P2 with two possible sources.

In order to provide a good coverage of hole with a low budget, it is advantageous that each cell among the neighbor cells 3-8 of said switched off cell 1 transmits at least one multimedia partition, over an extended range. This is equivalent to have no secondary subset empty.

Another way, complementary or additional to the previous, to provide a good coverage of hole is to have each multimedia partition, among all multimedia partitions, transmitted by at least one cell among the neighbor cells 3-8 of said switched off cell 1, over an extended range.

To compensate for possible perturbations incurred due to increased range for the partitions that are transmitted over an extended range, at least some of said transmissions over an extended range may advantageously be protected. A protection may be offered by the addition of a protection code. Let us consider such a protection code to have a coding rate of r. This means the use of said protection code adds an relative overhead of 1/r to a transmission, transforming an amount of x bits transmitted, to an increased amount of $$x \cdot \left(1 + \frac{1}{r}\right)$$

bits transmitted.

Said protection may e.g. comprise a forward error correction, FEC. Said protection prejudicially raises the budget by said overhead of 1/r but may allow in compensation for a reduction of the number of partitions transmitted either in the primary subset or in the secondary subset.

A multimedia partition transmitted over a normal range is typically transmitted using a reference or normal emitting power. Transmission of at least one multimedia partition over an extended range 3'-8' may be done with an emitting power extended with respect to a normal emitting power. The extension of the emitting power may be e.g. proportional to the extension of the range from normal range to extended range.

Alternately, transmission of at least one multimedia partition over an extended range 3'-8', if said partition is advantageously protected, may be done with an emitting power generally equal to a normal emitting power. Here the increased reliability provided by the protection may compensate for the relative decrease of emitting power.

Several embodiments may be adopted depending on the trading off between budget and QoE.

According to a first embodiment, favoring the QoE toward the budget, a neighbor cell may transmit all the partitions either with a normal range or with an extended range. Otherwise said, union of the primary subset and of the secondary subset of the cell comprises all multimedia partitions, or any partition is transmitted either over a normal range or over an extended range.

So doing, the power budget of the cell, with respect to the power budget of said cell if it would transmit all multimedia partitions over a normal range, that is, if all cells where ON, is increased by the budget caused by the range extensions. The budget of a switched on cell is slightly increased, but the QoE in the area normally covered by said cell is not degraded, that is, is kept unchanged. In order that the switching off of a cell remains advantageous, the increases of all neighbor cell budgets must together stay lesser than the power budget saved by the switching off of the cell.

The power budget according to the first embodiment may be computed. It is interesting to compare to the normal or initial power budget, without any switched off cell.

Let us consider as an illustration, a network with l cells, n MDC partitions and an elementary budget P to transmit one partition over a normal range. The initial power budget is l×n×P.

According to the first embodiment, let be 1/k a ratio of switched on cells, and thus l/k a number of switched on cells, let be m a number of partitions transmitted with an extended range (that is the cardinal of the secondary subset), and P' an elementary budget to transmit one partition over an extended range. P' may e.g. be calculated with the formula of emitted power function of distance, e.g. obtained from the following Walfish-Ikegami model:

$$P_{received} = C \times \left(\frac{4\Pi}{\lambda}\right)^{-2} \times d^{-i} \times P_{emitted}$$

where C is a constant, and i=2 in free space and i=2.6 in urban environment.

As the carrier frequency and the minimum reception level are kept the same for each partition, we can deduce that $P_{emitted} \propto d^i$.

Let d' be the extended distance. d'=k×d if we consider an extension in a linear referential. This leads to P'=$k^i$×P.

So the total power budget of the first embodiment is:

$$\frac{l}{k}[(n-m)P + m \times k^i P]$$

Energy is saved if said power budget is lesser than the initial power budget, that is:

$$\frac{l}{k}[(n-m)P + m \times k^i P] \leq l \times n \times P$$

That is: (n−m)+m×$k^i$≤k×n thus $$\frac{k^i - 1}{k - 1} \leq \frac{n}{m}.$$

This last inequality gives the condition for the switching off to be energy saving, under the first embodiment hypothesis.

According to a second embodiment, further limiting the global power budget, some partitions among all partitions may not be transmitted by a neighbor cell. In that case a neighbor cell only sends a reduced number of partitions. The omitted partitions may either be of a normal range or of an extended range. In that case, a protection of the remaining extended transmissions may compensate a reduced number by an increased reliability of remaining partitions.

Furthermore, the increased reliability provided by the protection, may even be considered sufficient to permit the needed coverage extension without extending the emitting power. A partition intended to be transmitted over an extended range may be transmitted with a normal emitting power, instead of an extended/increased one.

There, a number of partitions are absent from both primary and secondary subsets of the cell. They are thus not transmitted from said cell. Said number of non transmitted partitions may be determined so as to reduce the power budget. The higher is the number the lower is the power budget. In one particular case, the budget of a switched on cell is unchanged, but the QoE in the area normally covered by said cell is slightly degraded. It is also possible to lower the power budget for said cell under the normal power budget of said cell, that is, if it would transmit all multimedia partitions over a normal range. The eventual protection budget incurred by the eventual addition of some protection can here be taken into account.

The power budget according to the second embodiment may be computed. Let be j the number of absent partitions. n−j partitions are to be transmitted. n−j−m partitions are to be transmitted over a normal range, and m partitions have to be transmitted over an extended range. This leads to a budget of $$\frac{l}{k}[(n-m-j)P + mP']$$

if an extended emitting power P' is used for partitions transmitted over an extended range. If here, instead of raising the emitting power P to P', it is chosen to protect the extended partitions and to transmit them with an normal emitting power of P, said budget becomes $$\frac{l}{k}\left[(n-m-j) + m\left(1 + \frac{1}{r}\right)\right]P,$$

where r is a coding rate of the protection code.

With a hypothesis of an ON cell working with the same power budget as usual, when all cells are ON, the last formula may be rewritten $$(n-m-j)+m\left(1+\frac{1}{r}\right)=n, \text{ or } j=\frac{m}{r}.$$

This formula gives a value of the number j of non transmitted partitions guaranteeing a power saving. In fact, in that case, with m/r non transmitted partitions, the total budget becomes $$\frac{l}{k} \times n \times P,$$

lesser than the initial budget l×n×P. The energy saving is here directly function of k, that is of the ratio of switched off cells.

The number of independent autonomous multimedia partitions n may be linked to the number of neighbor cells of a switched off cell by another equation. If it is admitted that each neighbor cell of a switched off cell extends its range so as to cover half of the area left "empty" by said switched off cell, and that there are a number u of such neighbor cells, the number of independent autonomous multimedia partitions n is equal to u/2 times the cardinal of the secondary subset.

If hexagonal topology is retained, that is, if cells are regularly disseminated, a given switched off cell 1 has six neighbors (u=6). With such a modelling hypothesis, the number of independent autonomous multimedia partitions n is advantageously taken equal to a multiple of three (u/2), n=3×m. In that case m is advantageously the cardinal of the secondary subset. First example shows n=3 and m=1. Second example shows n=6 and m=3. m=2, with n=6, the optimal case, would be possible and equivalent to the first example. Second example is thus suboptimal in order to increase the QoE while also increasing the power budget.

Advantageously the method provides better results when switched off cells are regularly disseminated among all the cells. With a hexagonal hypothesis, different regular patterns of switching off may be retained with different densities that may adapt to the load decrease.

FIG. 6 shows a very dense switching off map, with a ratio of one switched off cell (pointed cells are switched off) out of three. In that case k=3/2. The periodic pattern of switching off is figured in grey.

FIG. 7 shows another switching off map, with a ratio of one switched off cell (pointed cells are switched off) out of four. In that case k=4/3. The periodic pattern of switching off is figured in grey.

The invention claimed is:

1. A method, in a cellular communication network comprising cells among which at least one cell is switched off, for providing at least a minimum coverage for multimedia transmission, said multimedia being parted into a number of independent autonomous multimedia partitions, comprising:
   transmitting from one or more neighbor cells of said switched off cell, one or more multimedia partitions of a primary subset of the one or more multimedia partitions over a normal range;
   transmitting from at least a first and a second neighbor cell of said switched off cell, one or more multimedia partitions of a secondary subset of the one or more multimedia partitions over an extended range, said secondary subset of said first neighbor cell being totally disjoint from said primary subset of said first neighbor cell, the secondary subset of said first neighbor cell being partially disjoint of the secondary subset of said second neighbor cell when said first cell and said second cell are adjacent.

2. The method of claim 1, wherein one or more cells among the one or more neighbor cells of said switched off cell transmit at least one multimedia partition, over an extended range.

3. The method of claim 1, wherein the one or more multimedia partitions are transmitted by at least one cell among the neighbor cells of said switched off cell, over an extended range.

4. The method of claim 1, wherein transmission of at least one multimedia partition over an extended range is protected by adding a protection code.

5. The method of claim 4, wherein said transmission is protected by forward error correction (FEC).

6. The method of claim 4, wherein transmission of at least one multimedia partition over an extended range is done with an emitting power generally equal to a normal emitting power used for transmitting over a normal range.

7. The method of claim 1, wherein transmission of at least one multimedia partition over an extended range is done with an emitting power extended with respect to a normal emitting power used for transmitting over a normal range.

8. The method of claim 1, wherein union of said primary subset and of said secondary subset of a neighbor cell comprises the one or more multimedia partitions.

9. The method of claim 1, wherein a number of multimedia partitions are absent from said primary subset and from said secondary subset of a neighbor cell and thus not transmitted from said cell.

10. The method of claim 9, wherein said number of absent multimedia partitions is determined so that the power budget for said neighbor cell, is lesser or equal than the power budget of said cell if it would transmit the one or more multimedia partitions over a normal range, taking into account any eventual protection budget.

11. The method of claim 10 wherein said number of absent multimedia partition is equal to the ratio of the cardinal of the secondary subset to the coding rate of the protection code.

12. The method of claim 1, wherein the number of independent autonomous multimedia partitions is equal to half the number of neighbor cells of a switched off cell times the cardinal of the secondary subset.

13. The method of claim 1, wherein switched off cells are regularly disseminated among the cells.

14. The method of claim 1, wherein totally disjoint means not comprising any multimedia partition in common.

15. The method of claim 1, wherein partially disjoint means not totally overlapping, wherein at least one multimedia partition in the primary subset is not in the secondary subset partially disjoint from said primary subset or at least one multimedia partition in the secondary subset is not in the primary subset.

* * * * *